(12) United States Patent
Shelby et al.

(10) Patent No.: US 8,135,868 B2
(45) Date of Patent: Mar. 13, 2012

(54) METHOD AND APPARATUS FOR PROCESSING MESSAGES

(75) Inventors: Zach Shelby, Sotkamo (FI); Mikko Saarnivala, Oulu (FI)

(73) Assignee: Sensinode Oy, Oulu (FI)

( * ) Notice: Subject to any disclaimer, the term of this patent is extended or adjusted under 35 U.S.C. 154(b) by 835 days.

(21) Appl. No.: 12/121,193

(22) Filed: May 15, 2008

(65) Prior Publication Data

US 2009/0276451 A1    Nov. 5, 2009

(30) Foreign Application Priority Data

May 5, 2008    (FI) ..................................... 20085409

(51) Int. Cl.
*G06F 15/16* (2006.01)
(52) U.S. Cl. ........ 709/249; 709/203; 709/230; 709/246; 715/254
(58) Field of Classification Search .................. 709/230, 709/236, 246, 203, 249; 715/254
See application file for complete search history.

(56) References Cited

U.S. PATENT DOCUMENTS

| | | | | |
|---|---|---|---|---|
| 7,647,415 | B1* | 1/2010 | Sandoz et al. ................ | 709/230 |
| 7,739,586 | B2* | 6/2010 | Suver et al. .................. | 715/205 |
| 2003/0172110 | A1* | 9/2003 | Kunisetty ..................... | 709/203 |
| 2005/0058144 | A1* | 3/2005 | Ayyagari et al. ............. | 370/401 |
| 2005/0234856 | A1* | 10/2005 | Baumhof ......................... | 707/1 |
| 2006/0129689 | A1 | 6/2006 | Ho et al. | |
| 2006/0168513 | A1* | 7/2006 | Coulson et al. ............... | 715/513 |
| 2006/0215571 | A1 | 9/2006 | Vernal et al. | |
| 2006/0253508 | A1* | 11/2006 | Colton et al. ................ | 707/206 |
| 2007/0044012 | A1* | 2/2007 | Suver et al. .................. | 715/513 |
| 2007/0115917 | A1* | 5/2007 | Miller et al. ................. | 370/351 |
| 2007/0288603 | A1* | 12/2007 | Onslow ......................... | 709/219 |
| 2008/0020354 | A1* | 1/2008 | Goree et al. .................. | 434/11 |
| 2009/0193431 | A1* | 7/2009 | Beard et al. .................. | 719/314 |
| 2010/0070649 | A1* | 3/2010 | Ng ................................ | 709/236 |

FOREIGN PATENT DOCUMENTS

CN    101047663 A    10/2007

OTHER PUBLICATIONS

Lu et al, "Building a Generic SOAP Framework over Binary XML," 2006 15th IEEE international Symposium on, Jul. 2006, pp. 195-204.*
International Search Report mailed Aug. 12, 2009 for International Patent Application No. PCT/FI2009/050353.
Search Report for Finnish priority application No. 20085409.

(Continued)

*Primary Examiner* — Oanh Duong
(74) *Attorney, Agent, or Firm* — Barnes & Thornburg LLP

(57) ABSTRACT

An apparatus and a method for transforming Simple Object Access Protocol (SOAP) messages is provided. The method comprises receiving and transmitting Extensible Markup Language (XML) format SOAP messages by using an application protocol and TCP/IP, a message comprising message elements and receiving and transmitting binary messages comprising binary message elements. A transformation is performed between an XML format message and a binary message by replacing (316-320) each message element of a given format with a message element in the other format. When transforming an XML message to binary format, the application protocol packet type and TCP/IP acknowledgement data are included (312) in the binary header. When transforming a binary format message to XML format, the application protocol packet type is selected on the basis of the information in the binary header of the binary format message.

36 Claims, 4 Drawing Sheets

OTHER PUBLICATIONS

Lu, W. et al: "Building a Generic SOAP Framework Over Binary XML", 15th IEEE Int'l Conference on High Performance Distributed Computing, Paris, France, Jun. 19-23, 2006, pp. 195-204.

Seshasayee, B. et al: SOAP-binQ: High-Performance SOAP with Continuous Quality Management, Proceedings of 24$^{th}$ International Conference on Distributed Computing Systems, Hachioji, Tokyo, Japan Mar. 24-26, 2004.

* cited by examiner

METHOD AND APPARATUS FOR PROCESSING MESSAGES

This application claims the benefit of foreign priority under 35 U.S.C. §119 to Finnish Application No. 20085409, filed May 5, 2008, which is incorporated herein by reference in its entirety.

FIELD

The invention relates to a method and an apparatus for processing messages. In particular, the invention relates to processing automated messages between computer servers or nodes in computer networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In modern communication and computer networks, data exchange between programs and computers is a vital element. Different programs, computers and processors exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

SOAP (Simple Object Access Protocol) is an Internet service messaging protocol which is widely used in the transmission of automated messages between computer servers on the Internet. SOAP provides an extensible format for providing message exchanges between computers to achieve any given task. At present, the content of a SOAP message is encoded using Extensible Markup Language (XML). XML can be used to represent any kind of information. The messages are made up of structured XML tags. When SOAP messages are transmitted over the Internet, they use an application protocol such as HTTP over TCP/IP or Session Initiation Protocol (SIP) over TCP/IP.

Low-power wireless networks, such as IEEE 802.15.4 based embedded and sensor networks, have extremely limited resources for transmitting packets. These networks are very energy efficient, and the chip technology is cheap. For this reason the technology is making its way to embedded devices very quickly for automation, measurement, tracking and control, for example.

The low-power wireless standard IEEE 802.15.4 has been proven as a technology for wireless automation and control. However it has extremely limited resources in terms of frame size (127 Bytes, of which about 90 Bytes available after network protocols), data rates (250 kbps) and network topology along with an unreliable wireless channel. Thus, it is very problematic to use HTTP over TCP/IP for computer—computer communication in these networks. Using XML based SOAP over TCP/IP and HTTP is a very inefficient and heavy solution for low power networks. In fact, in light of the above mentioned limited resources, the use of traditional SOAP is almost impossible as a typical SOAP message takes kilobytes of data and TCP is not well suited to unreliable wireless networks.

Currently application protocols for IP-based low-power wireless networks are designed and implemented in a customary way with each application designer making a byte format of their own, usually useable only within that network. Thus, communication capabilities are very limited.

BRIEF DESCRIPTION

An object of the invention is to provide an improved solution for encoding messages between computer servers or nodes in computer networks.

According to an aspect of the present invention, there is provided an apparatus, configured to receive and transmit Extensible Markup Language (XML) format Simple Object Access Protocol (SOAP) messages by using an application protocol and transmission control protocol/internet protocol (TCP/IP), a message comprising message elements; receive and transmit binary messages comprising a binary header and binary message elements; perform a transformation between an XML/SOAP format message and a binary message by replacing each message element of a given format with a message element in the other format; include, when transforming an XML/SOAP message to binary format, the application protocol packet type and TCP/IP acknowledgement data in the binary header; and select, when transforming a binary format message to XML/SOAP format, the application protocol packet type and response code on the basis of the information in the binary header of the binary format message.

According to another aspect of the present invention, there is provided a method, comprising: receiving and transmitting Extensible Markup Language (XML) format Simple Object Access Protocol (SOAP) messages by using an application protocol and transmission control protocol/internet protocol (TCP/IP), a message comprising message elements; receiving and transmitting binary messages comprising binary message elements; performing a transformation between an XML/SOAP format message and a binary message by replacing each message element of a given format with a message element in the other format; including, when transforming an XML/SOAP message to binary format, the application protocol packet type and TCP/IP acknowledgement data in the binary header; and selecting, when transforming a binary format message to XML/SOAP format, the application protocol packet type and response code on the basis of the information in the binary header of the binary format message.

According to another aspect of the present invention, there is provided an apparatus, comprising: means for receiving and transmitting Extensible Markup Language (XML) format Simple Object Access Protocol (SOAP) messages by using an application protocol and transmission control protocol/internet protocol (TCP/IP), a message comprising message elements; means for receiving and transmitting binary messages comprising a binary header and binary message elements; means for performing a transformation between an XML/SOAP format message and a binary message by replacing each message element of a given format with a message element in the other format; means for including, when transforming an XML/SOAP message to binary format, the application protocol packet type and TCP/IP acknowledgement data in the binary header; and means for selecting, when transforming a binary format message to XML/SOAP format, the application protocol packet type and response code on the basis of the information in the binary header of the binary format message.

According to yet another aspect of the present invention, there is provided an apparatus, configured to receive and transmit binary Simple Object Access Protocol (SOAP) messages comprising a binary header and binary message elements, the binary header comprising an application protocol packet type and transmission control protocol/internet protocol (TCP/IP) acknowledgement data.

The invention provides several advantages. Embodiments of the invention allow a universal messaging system (SOAP) to be used on low-power wireless networks where up until now, mostly proprietary application-specific protocols have been used. Compression and decompression of SOAP messages is transparent, allowing end-to-end messaging. The messaging may be transported over unreliable transport protocols thus removing the need of HTTP and TCP as transport. The binary encoded SOAP can also be used within the low-power network without a need for decompression.

LIST OF DRAWINGS

Embodiments of the present invention are described below, by way of example only, with reference to the accompanying drawings, in which FIG. 1 illustrates an example of a network to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

As already stated, modern applications running in computing equipment connected to communication and computer networks communicate with each other. SOAP (Simple Object Access Protocol) was designed to provide a suitable platform for communication between applications running in different environments, operating systems and computers.

SOAP was built on XML. A SOAP message is an XML document which contains given elements, some of which are required and some optional. Each SOAP message must contain an Envelope element that defines the XML document as a SOAP message. The Envelope element is the root element of the XML document.

The message may contain an optional header that comprises header information. The header information comprises application specific data about the message.

A SOAP message must comprise a body element which contains message elements, such as call and response information. The body element may contain various number of child elements. In addition, a SOAP message may contain a fault element providing information about possible error messages.

SOAP messages comprise namespace declarations. Namespaces identify the message elements used in the message. Typically, namespaces are declared in the root element of an XML document. Namespaces may also be declared in the elements in which they are used.

At present, SOAP is generally run over HTTP and TCP/IP. An application uses HTTP to connect to a server using the TCP/IP protocol. The application may send requests to a server using an HTTP request. The server may send responses to the application by using an HTTP response. The response comprises a status code indicating the status of the request. Examples of status codes are "200 OK" and "400 bad request".

Thus, HTTP requests and responses are utilized in SOAP. A SOAP request may be mapped or bound to an HTTP POST or HTTP GET request. The HTTP POST request utilizes at least two HTTP headers: Content-Type and Content-Length. The former defines the MIME type for the message and the character encoding used for the XML body of the request or response. The latter specifies the length of the request or response in bytes. The binding of SOAP with HTTP defines which methods to use and how to handle reliability, for example.

In addition, SOAP may be run over SIP and TCP/IP. SIP and HTTP are both application protocols which are run over TCP/IP. SIP is similar to HTTP and features a similar request-response structure.

Figure 1:
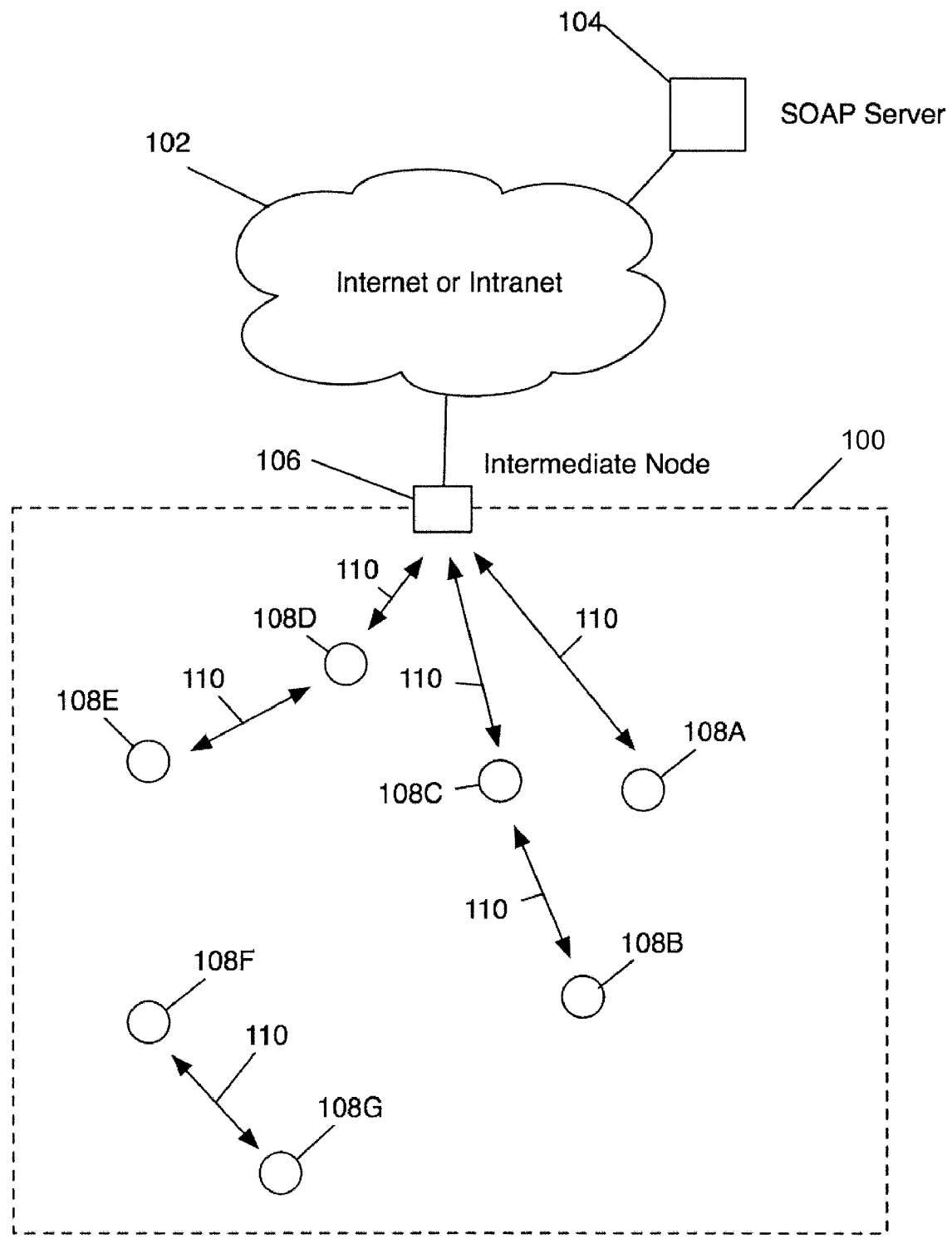

FIG. 1 illustrates an example of a network to which embodiments of the invention may be applied. The example network of FIG. 1 comprises a low-power wireless network 100, Internet/Intranet 102 and an IP-based network with SOAP servers 104. The low-power wireless network may be connected to the Internet/Intranet and IP-based network via an intermediate SOAP node 106, which is physically either a wireless router between the low-power wireless network and the Internet/Intranet or an edge server located in the IP network.

In the Internet/Intranet 102 and the IP-based network with SOAP servers 104 SOAP messaging is implemented using XML encoding and transmitted using HTTP over TCP/IP.

The low-power wireless network 100 may be a multihop network comprising a set of wireless low-power nodes 108A-108G. The low-power wireless nodes 108A-108G make up the network using wireless links 110. The wireless links 110 may be realized using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low power transmission. IEEE stands for Institute of Electrical and Electronics Engineers.

In an embodiment, User Datagram Protocol (UDP) is utilized in low-power networks instead of TCP/IP. UDP does not guarantee reliability or ordering in the way that TCP does. Transmitted packets may be received out of order, they may be duplicated, or go missing. However, the protocol is fast and efficient and suitable for low-power situations. Low power networks are typically utilized in wireless automation, control and sensor applications. The usability of the embodiments of the invention does not depend upon the application of the low power network.

The low-power wireless nodes 108A-108G may implement SOAP messaging by using a binary encoding detailed below. These nodes can forward, use and manipulate the binary SOAP messages within the network just as servers in the IP-based network XML encoded SOAP messages without the need for transformation between XML and binary encoding. Nodes may exchange binary encoded SOAP messages without any network support, as nodes 108F and 108F in FIG. 1.

When SOAP messages are transmitted between the low-power network 100 and the IP-based network 104, the messages must be transformed from the binary encoding to XML encoding and vice versa. In an embodiment, the transformation is made in the intermediate node 106.

Figure 2:
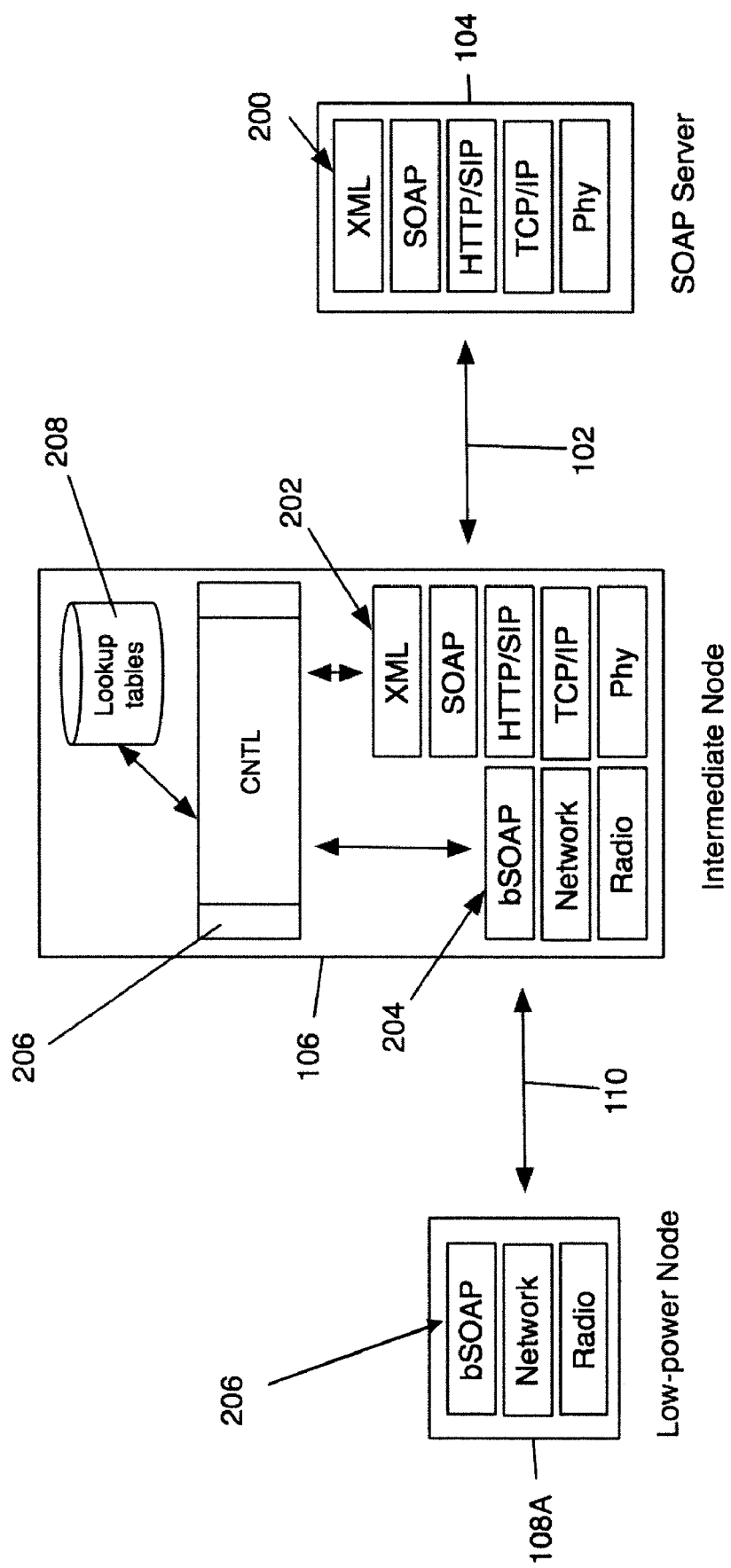
FIG. 2 illustrates protocol stacks in XML-based and binary-based SOAP messaging.

FIG. 2 illustrates protocol stacks in XML-based and binary-based SOAP messaging. In the figure, a SOAP server 104, the intermediate node 106 and a low power node 108A are shown. The SOAP server 104 and the intermediate node 106 are connected with each other via an IP-based network, such as the Internet/Intranet 102. The intermediate node and a low power node 108A are connected with each other via a low power wireless link 110.

The intermediate node 106 communicates with the IP-based network with SOAP servers by using XML encoded SOAP messaging and with the low-power nodes by using binary encoded SOAP messaging. In XML encoded SOAP messaging, the protocol stacks 200, 202 comprise a physical layer, followed by TCP/IP and HTTP. SOAP is transported on top of HTTP by using Request/Response POST or GET. The content of the SOAP message is encoded by using XML. HTTP may be replaced with other application protocols, such as SIP.

The binary encoded SOAP messaging is a compressed version of the XML encoded messaging. XML tags are replaced with binary equivalents and respective binding. The binary encoded SOAP messaging carries all the functionality of the SOAP messaging but requires only a very small transmission capacity, thus making it suitable for low-power and low-capacity networks. The transformation of XML encoded SOAP not only encodes the XML tags but also takes into account the HTTP and TCP/IP binding. Thus, SOAP may be transported over unreliable networks.

In the binary encoded SOAP, the protocol stacks 204, 206 of the low-power nodes and the intermediate node are made up of a radio layer, a networking layer and then binary SOAP encoding. The network layer depends on the wireless link technology used. The network layer may be based on IPv6 (6lowpan) over IEEE802.15.4 with UDP, for example. The binary encoded SOAP is run directly over the networking without HTTP. XML encoding is replaced by compact binary encoding defined below. In this case, SOAP is bound to a low-power wireless stack by using unreliable transport, such as UDP.

In an embodiment, the network unit configured to perform SOAP encoding transformation between XML and binary messaging comprises a processor 206 utilizing a compression/decompression algorithm used in the transformation, and a memory 208 for storing a set of lookup tables which define the transformation.

In an embodiment, the set of lookup tables describe how a particular binding (SOAP/HTTP e.g.) maps to the low-power binary SOAP binding. The lookup tables tell how which transport methods of the bindings correspond with each other. This describes how reliability is dealt with and which compression technique is used to transform the SOAP header and body.

Figure 3:
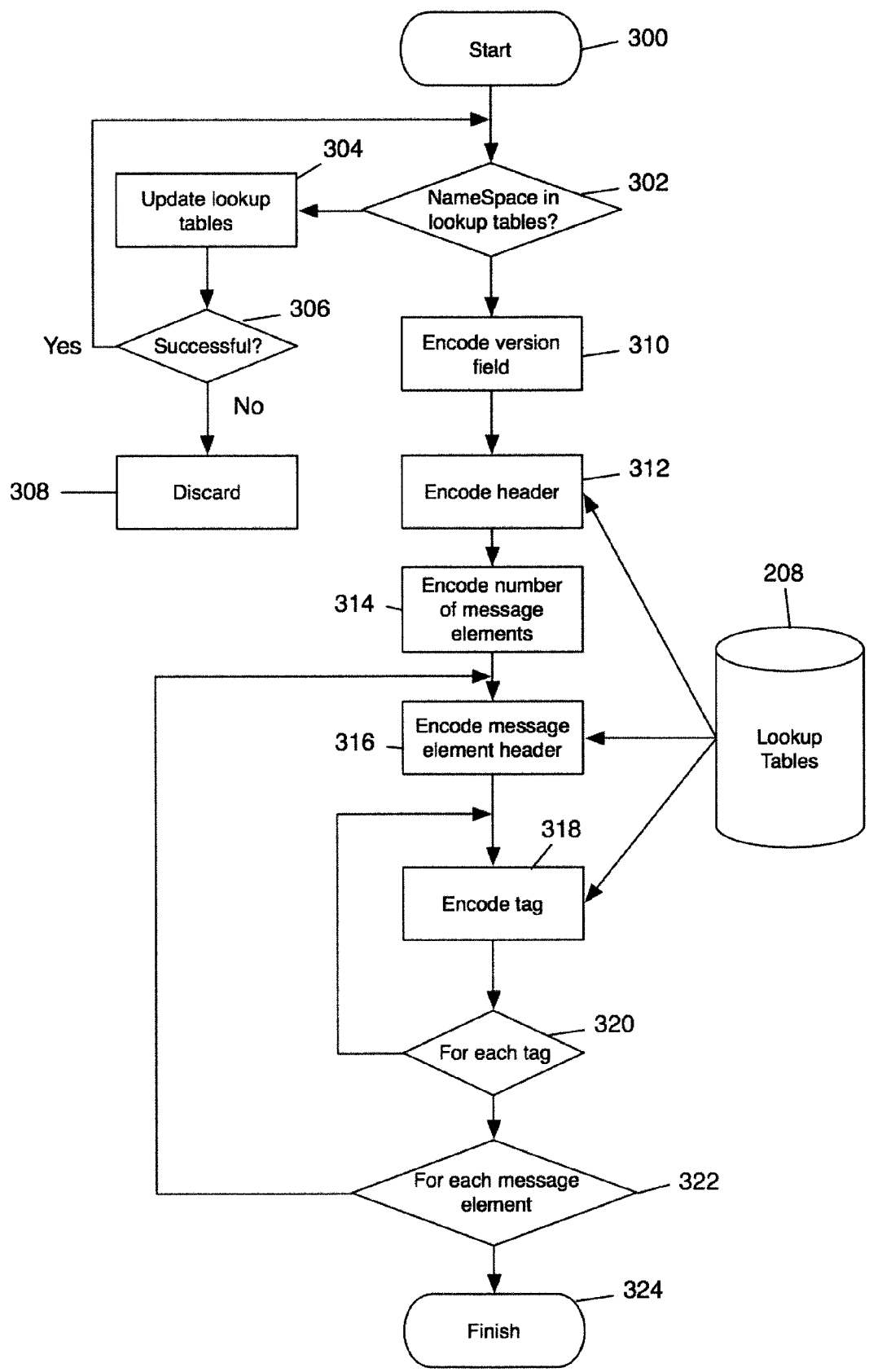
FIG. 3 is a flowchart illustrating an embodiment of the invention.

FIG. 3 is a flowchart illustrating an embodiment of invention. Here, HTTP is used as an example of an application protocol.

The process starts at 300 when a full SOAP message encoded with XML and destined to a low-power binary SOAP network is received at the intermediate node 106. The intermediate node performs the transformation of the XML encoding to binary encoding. It is assumed that the SOAP/XML has been checked for correctness.

In step 302, the namespace of the message is detected from the message and checked against namespaces available in the lookup table 208 of the intermediate node.

If the namespace of the message was not found from the lookup tables 208, the intermediate node may request it from a network server on demand in step 304. The namespace lookup tables can be updated remotely in the same manner as new services may be added to a network. If a lookup table update was successful, the process starts again from step 302. If a lookup table update was not successful, the message cannot be processed and it must be discarded in step 306.

If the namespace is available, processing continues in step 310.

In step 310, the version number of the encoding and the namespace used are encoded into the binary SOAP message. Typically, the encoding of the version field takes one byte.

In step 312, the header of the binary SOAP message is encoded. The encoding is partly based on the header of the XML encoded message. SOAP header processing rules may be encoded into the binary header. In addition, the binary header comprises transport related information which enables transporting the message over unreliable networks where HTTP and TCP/IP methods are not available.

In an embodiment, the version of the encoding and the namespace are encoded as the first bytes of the binary header.

In an embodiment, the HTTP packet type and response code (request, response and code, ack, put etc.) are encoded into the binary header. TCP/IP reliability may be replaced with an Acknowledgement field in the binary header. The Acknowledgement field indicates whether the recipient of the message should send an acknowledgement to the originator of the message after receiving the message.

The first byte of the header describes the number of headers. The rest of the header is encoded as {header type, value} tuples. Thus, each header tag is encoded using two bytes. The header type code and value options are contained in lookup tables. Other header types can be defined as needed for the binding.

In step 314, the number of message elements in the SOAP message is encoded after the header tuples. In an embodiment, the number of message elements is encoded as a byte.

Next the message elements of the SOAP message are encoded one by one.

In step 316, the number of tags within the message element and the length in bytes of the message element are encoded based on the lookup table 208. In an embodiment, the number of tags within the message element is encoded as a byte and the length in bytes of the message element is encoded as a byte.

In step 318, a tag of the message element is encoded using an appropriate tuple {tag code, data type, value}. In an embodiment, the encoding of the tag code and the data type takes a byte each. The encoding of the value varies depending on the data type and the value of the tag.

This is repeated 320 for each tag of the message element.

Tags are nested using an array data type with the value of the number of elements in the array. Tag endings are not used, thus saving space. As explicit length fields are used in this binary byte encoding, it is easy to parse while still being compact. A data type table is used to convert standard SOAP data types to binary encoded data types. The most efficient data types are chosen. For example, there can be five different binary types of the XML integer type. Each binary type is represented by a one byte code in the lookup table.

A complicated XML encoded tag and the value of the tag can usually be compressed down to 3-5 bytes in binary encoding. For example, the following XML tag consumes 41 bytes.

<MeasurementValue>56</MeasurementValue>

It should be noted that in XML, the value 56 is represented as a character string. In the transformation, this is automatically compressed to the smallest number format, in this case an 8-bit unsigned integer. Using the described binary encoding, the above XML tag would be encoded as the following 3 bytes:

```
0xa5    // The code of the tag from a lookup table
0x01    // The data type, in this case an 8-bit unsigned integer
56      // The value of the tag
```

Thus, a 41-byte XML tag may be encoded to a 3-byte binary tag. The actual binary values in the above encoding are provided merely as an example of possible values.

The above steps 316 to 320 are repeated 322 for each message element the SOAP message comprises.

When all message elements have been encoded, the transformation process ends in step 324. When the transformation of the XML format message to a binary format message is complete, the message may be transmitted over the low-power network protocol specified in the compression mapping. For example, this binary SOAP message could be transmitted inside UDP with IPv6 (6lowpan) over IEEE802.15.4 and an IEEE 802.15.4 radio.

In the opposite transform direction, the process is reversed. The lookup table 208 of the message namespace is utilized to reconstruct the full XML/SOAP message along with the binding mapping to the selected application protocol, such as HTTP or SIP. Thus, the binary header comprising the application protocol packet type and response code are transformed to actual application protocol packet with correct packet type and response code.

The following is a very basic example of a SOAP message carried in HTTP.

```
POST /InStock HTTP/1.1
Host: www.example.org
Content-Type: application/soap+xml; charset=utf-8
Content-Length: nnn
<?xml version="1.0"?>
<soap:Envelope
xmlns:soap="http://www.w3.org/2001/12/soap-envelope"
soap:encodingStyle="http://www.w3.org/2001/12/soap-encoding">
    <soap:Body xmlns:m="StockNamespace">
        <m:GetStockPrice>
            <m:StockName>CBC</m:StockName>
        </m:GetStockPrice>
    </soap:Body>
</soap:Envelope>
```

The namespace used in the message is StockNamespace. Let us assume that the lookup table 208 comprises following transformation codes for the StockNamespace namespace:

| Element | Code |
|---|---|
| StockNamespace | 0x01 |
| GetStockPrice | 0x03 |
| StockName | 0xa4 |
| MeasurementValue | 0xa5 |

The binary encoded message is represented below. Again, the actual binary values in the above encoding are provided merely as an example of possible values. Everything after "//" on each line is a comment and 0x03 is a representation of an 8-bit hex number. Note that the above XML message does not comprise a header. However, the header is encoded to the binary message as the binary header comprises HTTP information.

```
0x01        // Version and namespace of the encoding
0x01        // Header for message type
0x00        // Request type, equivalent to HTTP Request
using POST
            // Body starts here
0x01        // One message in the body
0x03        // GetStockPrice message code
0x01        // One tag element
0x05        // Length of message = 5 bytes
0xa4        // StockName tag code
0x05        // String data type
'C'         // ASCII code
'B'         // ASCII code
'C'         // ASCII code
```

The original HTTP/SOAP/XML message took 394 bytes. When transformed into binary encoding, the message takes only 12 bytes with no loss of content. This is suitable for a low-power wireless frame, which has usually a payload of 40-100 bytes.

In an embodiment, TCP/IP reliability may be replaced with an Acknowledgement field in the binary header. This enables transporting the message over unreliable networks where HTTP and TCP/IP methods are not available.

In an embodiment, the acknowledgement mechanism may be utilized in the following manner.

When the intermediate node 106 receives a binary SOAP message, which is forwarded outside the low-power network over a reliable transport such as TCP, then a binary SOAP acknowledgement is immediately sent to the originator.

When any low-power SOAP node receives a binary SOAP put message, it responds with an acknowledgement. However, if the receiving node immediately replies to the request with a response message, then an acknowledgement is not to be sent.

If the sending node does not receive a response or an acknowledgement within a given timeout, period then a retransmission is made.

Figure 4A:
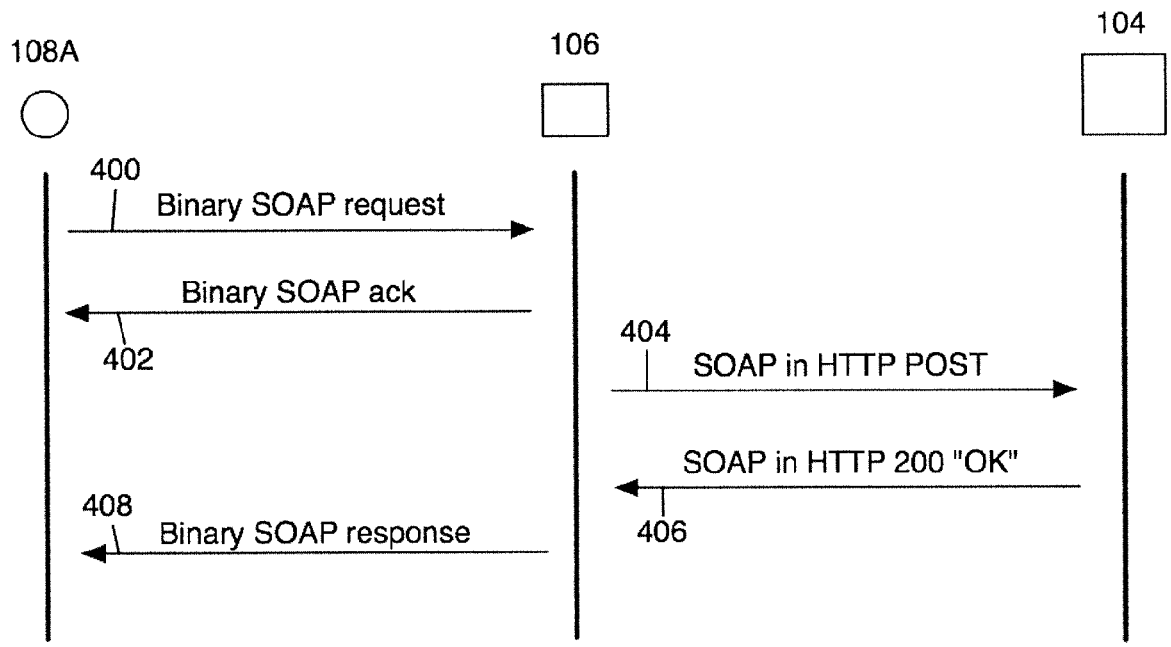
FIGS. 4A and 4B illustrate an example of the exchange of messages.
Figure 4B:
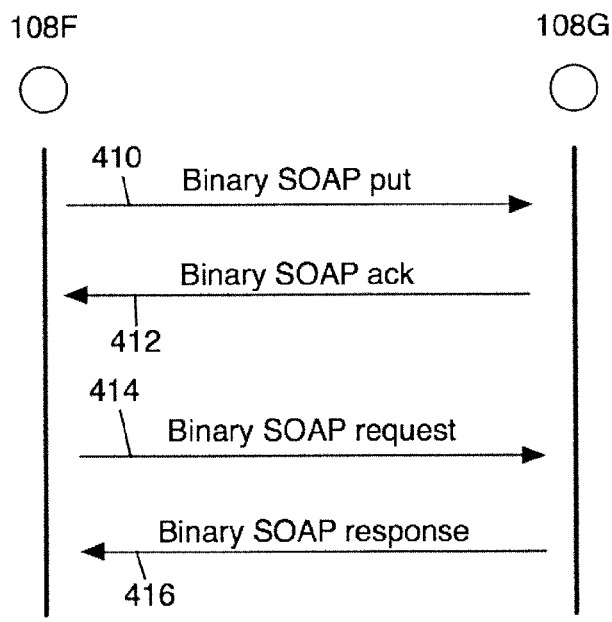

FIGS. 4A and 4B illustrate an example of the exchange of messages in the acknowledgement mechanism. FIG. 4A illustrates an example of message exchange between a low-power node 108A through the intermediate node 106 to a SOAP server 104 and back. First, the low-power node 108A sends a binary SOAP request message 400 to the intermediate node 106. The recipient of the message is the SOAP server 104. The node 108A has set the Acknowledgement field of the message header as TRUE. The intermediate node 106 answers with an acknowledgement 402.

The intermediate node 106 performs transformation of the binary SOAP message to XML format and sends the full SOAP request 404 over HTTP (POST) to the ultimate endpoint, SOAP server 104. This message will be replied with a SOAP reply in an HTTP 200 "OK" message 406. Upon reception of the SOAP reply the intermediate node transforms this XML format message into a binary SOAP response and sends it 408 to the node 108A.

FIG. 4B illustrates an example of message exchange between two low-power nodes 108F and 108G in the low-power network 100. The node 108F sends a binary SOAP message 410 including a put method to the node 108G. A put method is always answered by an acknowledgement 412, because a put is by nature a one-way message. On the other hand, when the node 108F sends a binary SOAP request 414 to the other node 108G, it is answered by a SOAP response 416 and no acknowledgement is sent.

The intermediate node 106 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The node is configured to be in connection with the low-power wireless network and the Internet/Intranet with suitable interfaces. The node comprises a processing unit configured to perform the transformation process described in connection with FIG. 3. The node may comprise a memory for storing a set of lookup tables 208. In an embodiment, the lookup tables are stored in another device connected to the intermediate node. The processing unit may be configured to request lookup tables from a network server on-demand if required. The node may be a wireless router or between the low-power wireless network and the Internet/Intranet or an edge server located in the IP network.

An embodiment provides a computer program embodied on a distribution medium, comprising program instructions which, when loaded into an electronic apparatus, execute a computer process, the process comprising: receiving and transmitting Extensible Markup Language (XML) format Simple Object Access Protocol (SOAP) messages by using an application protocol and transmission control protocol/internet protocol (TCP/IP), a message comprising message elements; receiving and transmitting binary messages comprising binary message elements; performing a transformation between an XML format message and a binary message by replacing each message element of a given format with a message element in the other format; including, when transforming an XML message to binary format, the application protocol packet type and TCP/IP acknowledgement data in the binary header; and selecting, when transforming a binary format message to XML format, the application protocol packet type and response code on the basis of the information in the binary header of the binary format message.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, configured to:
   receive and transmit Extensible Markup Language format Simple Object Access Protocol (XML/SOAP) messages by using an application protocol and transmission control protocol/internet protocol (TCP/IP), each of the XML/SOAP messages comprising XML encoded SOAP message elements;
   receive and transmit binary format messages comprising a binary header and binary message elements;
   perform transformation between one of the XML/SOAP messages and one of the binary format messages by replacing each of the XML encoded SOAP message elements with each of the binary message elements;
   perform transformation between one of the binary format messages and one of the XML/SOAP messages by replacing each of the binary message elements with each of the XML encoded SOAP message elements;
   include, when transforming the XML/SOAP message to the binary format message, type of the application protocol and TCP/IP acknowledgement data in the binary header; and
   select, when transforming the binary format message to the XML/SOAP message, the application protocol type and response code based on information in the binary header of the binary format message.

2. The apparatus of claim 1, further configured to include, when transforming the XML/SOAP message to the binary format message, namespace used and a version number of encoding in the binary format message.

3. The apparatus of claim 1, further configured to utilize lookup tables in the transformation.

4. The apparatus of claim 3, further configured to determine a SOAP namespace used in the XML/SOAP message and select lookup tables on the basis of the SOAP namespace.

5. The apparatus of claim 4, the apparatus comprising a memory for storing the lookup tables.

6. The apparatus of claim 5, further configured to update the lookup tables from a remote server if a lookup table for the determined namespace is not stored in the memory of the apparatus.

7. The apparatus of claim 1, further configured to transmit the transformed XML/SOAP message to a desired destination.

8. The apparatus of claim 1, further configured to:
   receive the XML/SOAP message comprising the XML encoded SOAP message elements; c
   compress the XML/SOAP message to a binary SOAP message by encoding the namespace used and the version number of the encoding in the binary header, encoding the application protocol type and TCP/IP acknowledgement data in the binary header, replacing said each of the XML encoded SOAP message elements with said each of the binary message elements indicated by a lookup table, and transmit the binary SOAP message comprising the binary message elements to a desired destination.

9. The apparatus of claim 8, further configured to compress headers of the XML/SOAP message to binary {header type, value} tuples, wherein the values for the header type of the tuples are selected on the basis of lookup tables and value fields of the tuples are selected on the basis of values in the XML/SOAP message.

10. The apparatus of claim 8, further configured to indicate a number of XML encoded SOAP message elements of the SOAP/XML message as a binary number after the compressed headers in the binary message.

11. The apparatus of claim 8, further configured to compress said each of the XML encoded SOAP message elements by indicating a message element code, number of tags in said each of the XML encoded SOAP message elements and length of each of the XML encoded SOAP message elements and compressing each of the tags as tuples comprising tag code, data type and data value.

12. The apparatus of claim 1, further configured to:
receive a binary SOAP message comprising binary SOAP message elements;
decode namespace used and version number of encoding from a binary SOAP header of the binary SOAP message;
decompress the binary SOAP message to an XML format SOAP message by replacing each of the binary SOAP message elements with each of XML message elements indicated by a lookup table;
select the application protocol type and response code on the basis of information in the binary SOAP header of the binary SOAP message; and
transmit the XML format SOAP message comprising the XML message elements.

13. The apparatus of claim 1, further configured to respond to a binary format SOAP put message by sending a binary acknowledgement message to a sender of the binary format message.

14. The apparatus of claim 1, further configured to respond to a binary format SOAP message which is to be decompressed by sending a binary acknowledgement message to a sender of the binary format message.

15. The apparatus of claim 1, further configured to transmit the binary format message by using User Datagram Protocol (UDP).

16. The apparatus of claim 1, further configured to transmit the binary format message by utilizing one of the following transmission technologies:
IEEE 802.15.4 with Internet Protocol v6 (6lowpan),
IEEE 802.15.4 with ZigBee,
Bluetooth,
Bluetooth Ultra Low Power, and
Low Power Wireless Local Area Network.

17. The apparatus of claim 1, configured to receive and the XML/SOAP messages by using the Hypertext Transfer Protocol (HTTP).

18. The apparatus of claim 1, configured to receive and transmit the XML/SOAP messages by using Session Initiation Protocol (SIP).

19. The apparatus of claim 1, further configured to include, when transforming the XML/SOAP message to the binary format message, a namespace used and a version number of encoding in the binary header.

20. A method, comprising:
receiving and transmitting Extensible Markup Language format Simple Object Access Protocol (XML/SOAP) messages by using an application protocol and transmission control protocol/internet protocol (TCP/IP), each of the XML/SOAP messages comprising XML encoded SOAP message elements;
receiving and transmitting binary format messages comprising a binary header and binary message elements;
performing a transformation between one of the XML/SOAP messages and one of the binary format message by replacing each of the XML encoded SOAP message elements with each of the binary message elements;
perform transformation between one of the binary format messages and one of the XML/SOAP messages by replacing each of the binary message elements with each of the XML encoded SOAP message elements;
including, when transforming the XML/SOAP message to the binary format message, type of the application protocol and TCP/IP acknowledgement data in the binary header; and
selecting, when transforming the binary format message to the XML/SOAP message, the application protocol type and response code based on information in the binary header of the binary format message.

21. The method of claim 20, further comprising: including, when transforming the XML/SOAP message to the binary format message, a namespace used and a version number of encoding in the binary format message.

22. The method of claim 20, further comprising: utilizing lookup tables in the transformation.

23. The method of claim 22, further comprising: determining a SOAP namespace used in the XML/SOAP message and selecting the lookup tables on the basis of the SOAP namespace.

24. The method of claim 20, further comprising: transmitting the transformed XML/SOAP message to a desired destination.

25. The method of claim 20, further comprising:
receiving the XML/SOAP messages comprising the XML encoded SOAP message elements;
compressing the XML/SOAP message to a binary SOAP message by encoding a namespace used and a version number of encoding in a binary SOAP header,
encoding the application protocol type and the TCP/IP acknowledgement data in the binary SOAP header,
replacing said each of the XML encoded SOAP message elements with each of binary SOAP message elements indicated by a look up table, and
transmitting the binary SOAP message comprising the binary SOAP message elements to a desired destination.

26. The method of claim 20, further comprising compressing headers of the XML/SOAP message to binary {header type, value} tuples, wherein values for the header type of the tuples are selected on the basis of lookup tables and value fields of the tuples are selected on the basis of values in the XML/SOAP message.

27. The method of claim 20, further comprising:
receiving a binary SOAP message comprising binary SOAP message elements;
decoding a namespace used and a version number of encoding from a binary SOAP header of the binary SOAP message;
decompressing the binary SOAP message to an XML format message by replacing each of the binary SOAP message elements with each of XML message elements indicated by a look up table;
selecting the application protocol type and response code on the basis of the information in the binary SOAP header of the binary SOAP message; and
transmitting the XML format SOAP message comprising the XML message elements.

28. The method of claim 20, further comprising:
responding to a binary format SOAP put message by sending a binary acknowledgement message to a sender of the binary format message.

29. The method of claim 20, further comprising: responding to a binary format SOAP message which is to be decompressed by sending a binary acknowledgement message to a sender of the binary message.

30. The method of claim 20, further comprising: storing lookup tables in a memory.

31. The method of claim 30, further comprising: updating lookup tables from a remote server if a lookup table for the determined namespace is not stored in the memory.

32. The method of claim 20, wherein the application protocol is Session Initiation Protocol (SIP).

33. The method of claim 20, wherein the application protocol is the Hypertext Transfer Protocol (HTTP).

34. A computer program product comprising a computer program of instructions embedded in a non-transitory computer readable medium for executing a computer process carrying out a method comprising:

receiving and transmitting Extensible Markup Language format Simple Object Access Protocol (XML/SOAP) messages by using an application protocol and transmission control protocol/internet protocol (TCP/IP), each of the XML/SOAP messages comprising XML encoded SOAP message elements;

receiving and transmitting binary format messages comprising a binary header and binary message elements;

performing a transformation between one of the XML/SOAP messages and one of the binary format message by replacing each of the XML encoded SOAP message elements with each of the binary message elements;

perform transformation between one of the binary format messages and one of the XML/SOAP messages by replacing each of the binary message elements with each of the XML encoded SOAP message elements;

including, when transforming the XML/SOAP message to the binary format message, type of the application protocol and TCP/IP acknowledgement data in the binary header; and selecting, when transforming the binary format message to the XML/SOAP message, the application protocol type and response code based on information in the binary header of the binary format message.

35. A non-transitory computer readable medium encoding a computer program of instructions for executing a computer process carrying out the method comprising:

receiving and transmitting Extensible Markup Language format Simple Object Access Protocol (XML/SOAP) messages by using an application protocol and transmission control protocol/internet protocol (TCP/IP), each of the XML/SOAP messages comprising XML encoded SOAP message elements;

receiving and transmitting binary format messages comprising a binary header and binary message elements;

performing a transformation between one of the XML/SOAP messages and one of the binary format message by replacing each of the XML encoded SOAP message elements with each of the binary message elements;

perform transformation between one of the binary format messages and one of the XML/SOAP messages by replacing each of the binary message elements with each of the XML encoded SOAP message elements;

including, when transforming the XML/SOAP message to the binary format message, type of the application protocol and TCP/IP acknowledgement data in the binary header; and selecting, when transforming the binary format message to the XML/SOAP message, the application protocol type and response code based on information in the binary header of the binary format message.

36. An apparatus, comprising:

at least one mechanism configured to receive and transmit Extensible Markup Language format Simple Object Access Protocol (XML/SOAP) messages using an application protocol and transmission control protocol/internet protocol (TCP/IP), each of the XML/SOAP messages comprising XML encoded SOAP message elements;

at least one mechanism configured to receive and transmit binary format messages comprising a binary header and binary message elements; and at least one transformation mechanism configured to perform a transformation between one of the XML/SOAP messages and one of the binary format messages by replacing each of the XML encoded SOAP message elements with each of the binary message elements and perform transformation between one of the binary format messages and one of the XML/SOAP messages by replacing each of the binary message elements with each of the XML encoded SOAP message elements, wherein the at least one transformation mechanism comprises a processor, wherein:
when transforming the XML/SOAP message to the binary format message, type of the application protocol and TCP/IP acknowledgement data are included in the binary header, and when transforming of the binary format message to the XML/SOAP is performed, the application protocol type and response code are selected based on information in the binary header of the binary format message.

* * * * *